United States Patent [19]

Winnan

[11] 4,187,208

[45] Feb. 5, 1980

[54] COLORED ORGANOSILOXANE ELASTOMERS WITH IMPROVED FLAME RETARDANCY

[75] Inventor: Hewart W. Winnan, South Glamorgan, Wales

[73] Assignee: Dow Corning Limited, Barry, Wales

[21] Appl. No.: 891,588

[22] Filed: Mar. 30, 1978

[30] Foreign Application Priority Data

Mar. 31, 1977 [GB] United Kingdom ............... 13595/77

[51] Int. Cl.² ............................................. C08L 83/04
[52] U.S. Cl. ........................ 260/37 SB; 260/DIG. 24
[58] Field of Search .................. 260/37 SB, 45.8 NH; 548/364

[56] References Cited

U.S. PATENT DOCUMENTS

| | | | |
|---|---|---|---|
| 3,635,874 | 1/1972 | Laur et al. | 260/37 SB |
| 3,652,488 | 3/1972 | Harder | 260/37 SB |
| 3,780,057 | 12/1973 | Frey | 260/37 SB |
| 3,821,140 | 6/1974 | Milbert | 260/37 SB |

*Primary Examiner*—Lewis T. Jacobs
*Attorney, Agent, or Firm*—Robert F. Fleming, Jr.

[57] ABSTRACT

A composition which is curable to a flame retardant, pigmented silicone rubber. The composition consists essentially of a polydiorganosiloxane convertible to the solid elastic state, a reinforcing silica filler, an organic peroxide curing agent, platinum and a pyrazolone pigment. Such pigments have the advantage of not substantially reducing the flame retardant properties of the rubber.

5 Claims, No Drawings

COLORED ORGANOSILOXANE ELASTOMERS WITH IMPROVED FLAME RETARDANCY

This invention relates to vulcanisable compositions useful for the preparation of flame resistant silicone elastomers.

It is known that flame resistance can be imparted to silicone rubbers by incorporating into the composition prior to vulcanisation a small proportion of a platinum-containing material. Such a development in the art of silicone rubbers is described for example in U.K. Pat. Spec. Nos. 1,161,052 and 1,262,845. For certain applications of silicone rubbers, for example their use as cable insulation, it is desired that the rubber be coloured. However, attempts to incorporate the normally employed coloured inorganic pigments, for example those based on cadmium salts, into the abovementioned flame retardant rubbers have not resulted in a satisfactory product. It has been found that the presence of such inorganic pigments can reduce, or even destroy completely the flame retardant property.

According to this invention we have now found that certain organic pigments can be added to flame retardant silicone rubber compositions without detracting significantly from the flame retardant properties of the rubber.

Accordingly this invention provides a composition vulcanisable to a silicone rubber, said composition comprising (A) A polydiorganosiloxane convertible to the solid elastic state, wherein the organic substituents are selected from monovalent hydrocarbon groups and monovalent fluorinated hydrocarbon groups, at least 40 percent of the total substituents being methyl groups, any groups having aliphatic unsaturation being present in a proportion of not greater than 2 percent, the ratio of organic substituents to silicon atoms in the polydiorganosiloxane being in the range from 1.98 to 2.02, (B) a reinforcing silica filler (C) an organic peroxy vulcanising agent (D) from 2 to 150 parts by weight of platinum per million parts by weight of (A), and (E) from 0.01 to 10 parts by weight, per 100 parts by weight of (A), of a pyrazolone pigment.

Also included within the scope of this invention is a silicone rubber which is the product obtained by vulcanising the above specified vulcanisable composition.

The convertible polydiorganosiloxanes (A) employed in the compositions of this invention have a ratio of organic substituents to silicon atoms within the range from 1.98 to 2.02 and preferably in the range from 1.99 to 2.001. Such convertible polydiorganosiloxanes are well-known in the silicone rubber art and they may be homopolymers or copolymers and vary in consistency from high viscosity liquids to non-flowing gums. At least 40 percent of the total silicon-bonded organic substituents should be methyl groups, any remaining substituents being selected from other monovalent hydrocarbon groups and monovalent fluorinated hydrocarbon groups, preferably those having less than 10 carbon atoms. Most preferred are polydiorganosiloxanes wherein the organic substituents are methyl groups with optionally one or both of phenyl groups and vinyl groups. Examples of the operative polydiorganosiloxanes (A) are polydimethylsiloxanes, copolymers of dimethylsiloxane units and methylvinylsiloxane units, copolymers of dimethylsiloxane, diphenysiloxane and trimethylsiloxane units, copolymers of dimethylsiloxane, methylphenylsiloxane and methylvinylsiloxane units, copolymers of dimethylsiloxane, methylphenylsiloxane and dimethylvinylsiloxane siloxane units and methyl(trifluoropropyl) polysiloxanes. When the polydiorganosiloxane contains vinyl or other aliphatically unsaturated groups as substituents such groups may constitute up to 2 percent and preferably less than 1 percent of the total substituents. Any phenyl groups present preferably constitute no more than about 5 percent of the total number of substituents.

The polydiorganosiloxane (A) may comprise a single polymeric species or, if desired, it may consist of two or more different species of polydiorganosiloxane. For example, it may comprise a polydimethylsiloxane free of vinyl groups, or with the vinyl groups attached to terminal silicon atoms together with a polydimethylsiloxane having a proportion of vinyl groups attached to non-terminal silicon atoms.

The reinforcing silicas (B) which are present in the compositions of this invention are well known in the art and many types are available commercially. Preferably they have a surface area of at least 50 $m^2/g$ and may have surface areas up to 300 $m^2/g$. or higher. They may be untreated or pre-treated, or may be treated in-situ by the incorporation into the vulcanisable composition of suitable treating agents, for example hydroxyl or alkoxy-containing silanes and siloxanes, or silazanes. The proportion of reinforcing silica employed can in accordance with known procedures be varied within wide limits, for example from 10 to 100 parts by weight per 100 parts by weight of the polydiorganosiloxane (A). Preferably however, the silica is employed in a proportion of from 20 to 60 parts per 100 parts of (A).

As the vulcanising (curing) agent (C) for the composition there may be employed any free radical generating organic peroxide compound. Such compounds include both peroxides and peroxy esters, for example benzoyl peroxide, di-tertiary butyl peroxide, t-butyl cumyl peroxide, dicumyl peroxide, 2,4-dichlorobenzoyl peroxide, monochlorobenzoyl peroxide, tertiary butyl peracetate, tertiary butyl perbenzoate and 2,5-bis-(tertiary butyl peroxy)-2,5-dimethylhexane. The organic peroxy vulcanising agent can be present in conventional amounts, that is from about 1 to 10 parts, preferably from 0.5 to 5 parts, by weight per 100 parts by weight of (A).

The platinum (D) is present in a proportion of from 2 to 150 parts, preferably 20 to 75 parts, by weight per million parts by weight of the polydiorganosiloxane (A). The platinum may be incorporated in any form which permits homogeneous dispersion in the composition, for example as a platinum compound or complex. A variety of suitable compounds and complexes are known in the art and include for example chloroplatinic acid, platinum chlorides, complexes of platinous halides with compounds such as ethylene, propylene, butylene, vinyl-containing siloxanes and cyclopropane, $PtCl_2[P(CH_2CH_2CH_3)_3]_2$, $Pt(CH_3CN)_2Cl_2$ and $PtCl_2.PCl_3$. The preferred source of platinum is chloroplatinic acid.

Component (E) of the compositions of this invention is a pyrazolone, preferably a disazo pyrazolone, pigment. Such pigments may be conveniently incorporated into the rubber as a fine powder or as a masterbatch in, for example, a portion of the polydiorganosiloxane (A). This component (E) is employed in a proportion of from 0.01 to 10 parts, preferably 0.25 to 5 parts, by weight per 100 parts by weight of the polydiorganosiloxane (A).

In addition to the five essential ingredients specified hereinabove the compositions may contain other conventional additives, for example secondary fillers e.g. titanium dioxide, crushed quartz and diatomaceous earth, additives such as magnesium oxide and aluminum oxide and processing aids. If desired the flame retardant property imparted by the platinum may be increased by including a small proportion, up to about 10 parts per 100 parts of (A), of a fume titanium dioxide.

The compositions of this invention may be compounded by conventional techniques, for example on a two roll mill or in a dough mixer and may be vulcanised to flame retardant silicone rubbers by exposure to elevated temperatures to activate the peroxide vulcanising agent. Such a vulcanising (or curing) procedure is conventional in the art and involves for example exposure to hot air or to pressure at elevated temperatures. The present compositions are particularly useful for the production of electrical insulation for example in electric cables, but can also be fabricated into other articles such as seals and gaskets.

The following example, in which the parts are expressed by weight, illustrates the invention.

EXAMPLE.

The following ingredients were mixed thoroughly on a two roll mill:

| | |
|---|---|
| Vinyl-containing polydimethylsiloxane gum in which 0.07% of the total substituents are vinyl groups | 100 parts |
| Reinforcing (fume) silica | 55 parts |
| Low molecular weight polydimethylsiloxane having silanol groups | 7 parts |
| Diphenylsilanediol | 5 parts |
| 2,4-dichlorobenzoyl peroxide | 2.3 parts |
| 1% solution of chloroplatinic acid in isopropanol | 1.2 parts |
| Fume titania | 5.0 parts |
| Rare earth heat stability additive | 3.0 parts |
| Crushed quartz | 8.3 parts |
| Disazo pyrazolone pigment (Irgalite Orange P) | 0.75 parts |

The compounded stock was removed from the mill and a portion vulcanised to a sheet of silicone rubber in a press at 116° C. Portions of the sheet were exposed to temperatures of 180° C., 200° C. and 250° C. in air circulating ovens. After 16 hours exposure there was no discernible change in the original orange colour of the samples exposed to 180° C. and 200° C. The sample exposed to 250° C. was only slightly paler in colour.

A further sample of the vulcanised silicone rubber sheet was tested for flame retardancy according to the Underwriters Laboratory UL62-1968 flame test. It was found that burning occurred for 24 seconds during which a 7.6 cm. length of the sample was consumed. By contrast an identical silicone rubber which had been pigmented with a conventional cadmium salt pigment burned for 210 seconds during which the whole sample (at least 25 cm. in length) was consumed.

That which is claimed is:

1. A method for improving the flame resistance of a colored organosiloxane elastomer containing a platinum flame retarding agent wherein the elastomer is a composition vulcanizable to a silicone rubber containing:
   (A) a polydiorganosiloxane convertible to the solid elastic state, wherein the organic substituents are selected from monovalent hydrocarbon groups and monovalent fluorinated hydrocarbon groups, at least 40 percent of the total substituents being methyl groups, any groups having aliphatic unsaturation being present in a proportion of not greater than 2 percent, the ratio of organic substituents to silicon atoms in the polydiorganosiloxane being in the range from 1.98 to 2.02,
   (B) a reinforcing silica filler
   (C) an organic peroxide vulcanising agent and
   (D) from 2 to 150 parts by weight of platinum per million parts by weight of (A), the improvement consisting essentially of the addition of from 0.01 to 10 parts by weight per 100 weight of (A) of a pyrazolone pigment to the elastomer composition.

2. A method as claimed in claim 1 wherein the organic substituents in the polydiorganosiloxane (A) are methyl groups with optionally groups selected from phenyl and vinyl groups.

3. A method as claimed in claim 2 wherein the pyrazolone pigment is present in an amount of from 0.25 to 5 parts by weight per 100 parts by weight of the polydiorganosiloxane (A).

4. A method as claimed in claim 1 wherein the platinum (D) is present in a proportion of from 20 to 75 parts by weight per million parts by weight of (A).

5. A method as claimed in claim 1 wherein said composition also contains up to 10 parts by weight of a fume titanium dioxide per 100 parts by weight of the polydiorganosiloxane (A).

* * * * *

UNITED STATES PATENT AND TRADEMARK OFFICE
CERTIFICATE OF CORRECTION

PATENT NO. : 4,187,208
DATED : February 5, 1980
INVENTOR(S) : Hewart W. Winnan

It is certified that error appears in the above-identified patent and that said Letters Patent are hereby corrected as shown below:

In Column 4, line 32; the line reading "10 parts by weight per 100 weight of (A) of a py-" should read "10 parts by weight per 100 parts by weight of (A) of a py-".

Signed and Sealed this

Twenty-fourth Day of November 19:

[SEAL]

Attest:

*Attesting Officer*

GERALD J. MOSSINGHOFF

*Commissioner of Patents and Trademarks*